United States Patent
Tierney et al.

(10) Patent No.: US 11,034,142 B2
(45) Date of Patent: Jun. 15, 2021

(54) TEMPERATURE REGULATION TO IMPROVE ADDITIVE 3D PRINTING FUNCTION

(71) Applicant: Toyota Motor Engineering & Manufacturing North America, Inc., Erlanger, KY (US)

(72) Inventors: John Tierney, Georgetown, KY (US); Thomas King, Georgetown, KY (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 197 days.

(21) Appl. No.: 15/459,790

(22) Filed: Mar. 15, 2017

(65) Prior Publication Data
US 2018/0264750 A1  Sep. 20, 2018

(51) Int. Cl.
*B33Y 50/02* (2015.01)
*B33Y 10/00* (2015.01)
*B33Y 30/00* (2015.01)
*B29C 64/118* (2017.01)
*B29C 64/295* (2017.01)
*B29C 64/393* (2017.01)

(52) U.S. Cl.
CPC ............ *B33Y 50/02* (2014.12); *B29C 64/118* (2017.08); *B29C 64/295* (2017.08); *B29C 64/393* (2017.08); *B33Y 10/00* (2014.12); *B33Y 30/00* (2014.12)

(58) Field of Classification Search
CPC ......... B33Y 50/02; B33Y 10/00; B33Y 30/00; B29C 64/118; B29C 64/295; B29C 64/393

USPC ...................................................... 425/174.4
See application file for complete search history.

(56) References Cited

U.S. PATENT DOCUMENTS

| | | | | |
|---|---|---|---|---|
| 5,474,719 | A * | 12/1995 | Fan ........ | B29C 64/124 264/401 |
| 5,597,520 | A * | 1/1997 | Smalley .... | B29C 64/40 264/401 |
| 5,622,216 | A * | 4/1997 | Brown ..... | B22D 11/00 164/71.1 |
| 6,410,105 | B1 * | 6/2002 | Mazumder .. | B23K 26/032 427/554 |
| 6,811,744 | B2 * | 11/2004 | Keicher .... | B05B 7/14 419/5 |
| 9,339,972 | B2 | 5/2016 | Gordon | |
| 9,399,256 | B2 * | 7/2016 | Buller ..... | B29C 64/165 |
| 2002/0167101 | A1 * | 11/2002 | Tochimoto .. | B29C 41/36 264/40.1 |

(Continued)

OTHER PUBLICATIONS

Seppala, et al., Thermography and Weld Strength Characterization of Thermoplastic 3d Printing, SPE Antec Indianapolis, 2016, pp. 42-44.

*Primary Examiner* — Francisco W Tschen
*Assistant Examiner* — Guy F Mongelli
(74) *Attorney, Agent, or Firm* — Christopher G. Darrow; Darrow Mustafa PC

(57) ABSTRACT

Systems and methods for additive fabrication include directed thermal sensors, directed heating elements, and directed cooling elements. These elements detect, control, and modulate the temperature of freshly laid and adjacent roads during the fabrication of an object by the system. Such control, detection, and modulation improves road fusion and enables the fabrication of unsupported overhangs that are otherwise unattainable.

8 Claims, 6 Drawing Sheets

(56) References Cited

U.S. PATENT DOCUMENTS

| | | | | |
|---|---|---|---|---|
| 2006/0118532 A1* | 6/2006 | Chung | B29C 64/153 | 219/121.85 |
| 2007/0122562 A1* | 5/2007 | Adams | B33Y 10/00 | 427/532 |
| 2007/0182058 A1* | 8/2007 | Chen | B29C 48/834 | 264/211.11 |
| 2008/0070181 A1* | 3/2008 | Abolfathi | H04R 25/658 | 433/6 |
| 2008/0274241 A1* | 11/2008 | Steuer | A23L 5/30 | 426/231 |
| 2010/0152880 A1* | 6/2010 | Boyden | A61K 9/0019 | 700/117 |
| 2012/0007287 A1* | 1/2012 | Vermeer | B33Y 10/00 | 264/401 |
| 2012/0046779 A1* | 2/2012 | Pax | B29C 64/106 | 700/112 |
| 2012/0161350 A1* | 6/2012 | Swanson | B29C 64/106 | 264/40.7 |
| 2012/0162305 A1* | 6/2012 | Swanson | F04B 53/22 | 347/20 |
| 2012/0162314 A1* | 6/2012 | Swanson | B29C 64/106 | 347/37 |
| 2012/0164256 A1* | 6/2012 | Swanson | B29C 41/52 | 425/162 |
| 2012/0164330 A1* | 6/2012 | Swanson | B33Y 10/00 | 427/258 |
| 2014/0322383 A1 | 10/2014 | Rutter | | |
| 2015/0024169 A1* | 1/2015 | Martin | B29C 48/265 | 428/172 |
| 2015/0210007 A1* | 7/2015 | Durand | B29C 64/118 | 264/401 |
| 2015/0268099 A1* | 9/2015 | Craig | B23K 26/034 | 374/130 |
| 2016/0082669 A1* | 3/2016 | Tjellesen | B29C 35/16 | 425/375 |
| 2016/0236414 A1* | 8/2016 | Reese | B29C 64/386 | |
| 2016/0266573 A1* | 9/2016 | Bheda | G05B 19/4099 | |
| 2016/0297110 A1* | 10/2016 | Wu | B29C 35/16 | |
| 2016/0339646 A1* | 11/2016 | Baecker | B29C 64/147 | |
| 2016/0368207 A1* | 12/2016 | Hyde | B29C 64/20 | |
| 2017/0001373 A1* | 1/2017 | La Forest | C04B 38/0032 | |
| 2017/0028468 A1* | 2/2017 | Dellea | B29C 64/40 | |
| 2017/0043535 A1* | 2/2017 | Ng | B33Y 10/00 | |
| 2017/0052531 A1* | 2/2017 | Minardi | F23R 3/06 | |
| 2017/0056974 A1* | 3/2017 | Miyashita | B33Y 10/00 | |
| 2017/0057172 A1* | 3/2017 | Keicher | C04B 38/0032 | |
| 2017/0067636 A1* | 3/2017 | Lacy | F23R 3/06 | |
| 2017/0215453 A1* | 8/2017 | Carlock | A23G 1/50 | |
| 2018/0111336 A1* | 4/2018 | Mantell | B29C 48/252 | |

* cited by examiner

TEMPERATURE REGULATION TO IMPROVE ADDITIVE 3D PRINTING FUNCTION

TECHNICAL FIELD

The present disclosure generally relates to additive fabrication technology, and more particularly, to thermal monitoring and adjustment for improved effectiveness of fused filament fabrication and related processes.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Additive manufacturing processes, such as fused filament fabrication, are used to build objects from a substrate material de novo, often on the basis of a computerized model. Such processes generally require efficient fusion of the substrate material after deposition. These processes also frequently limited in the ability to construct objects having unsupported overhangs, since the requirements of substrate fusion and of overhang stability are largely contrary to one another.

Accordingly, it would be desirable to provide an improved additive fabrication system having a temperature or curing control system that facilitates proper fusion and stabilization of the build layers.

SUMMARY

This section provides a general summary of the disclosure, and is not a comprehensive disclosure of its full scope or all of its features.

In various aspects, the present teachings provide a system for reinforcing portions of a build object formed by an additive, extrusion-based 3D printing operation, such as filament fabrication techniques. The system includes an extrusion head configured to receive a substrate material and to selectively deposit the substrate material as a road to create a build object. The system also includes a thermal detector and a heating element configured to heat a first region of defined area at a first location on the build object. The system additionally includes a cooling element configured to cool a second region of defined area at a second location on the build object.

In other aspects, the present teachings provide a method for stabilizing an unsupported overhang in a fused filament fabrication process. The method includes a step of extruding a road onto a build object. The method also includes a step of identifying a portion of the road defining an unsupported overhang. The method also includes a step of directing a cooling element to cool the unsupported overhang portion of the road while the road is being extruded. The method can optionally include a step of directing a heating element to heat a portion of the unsupported overhang.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

Figure 1A:
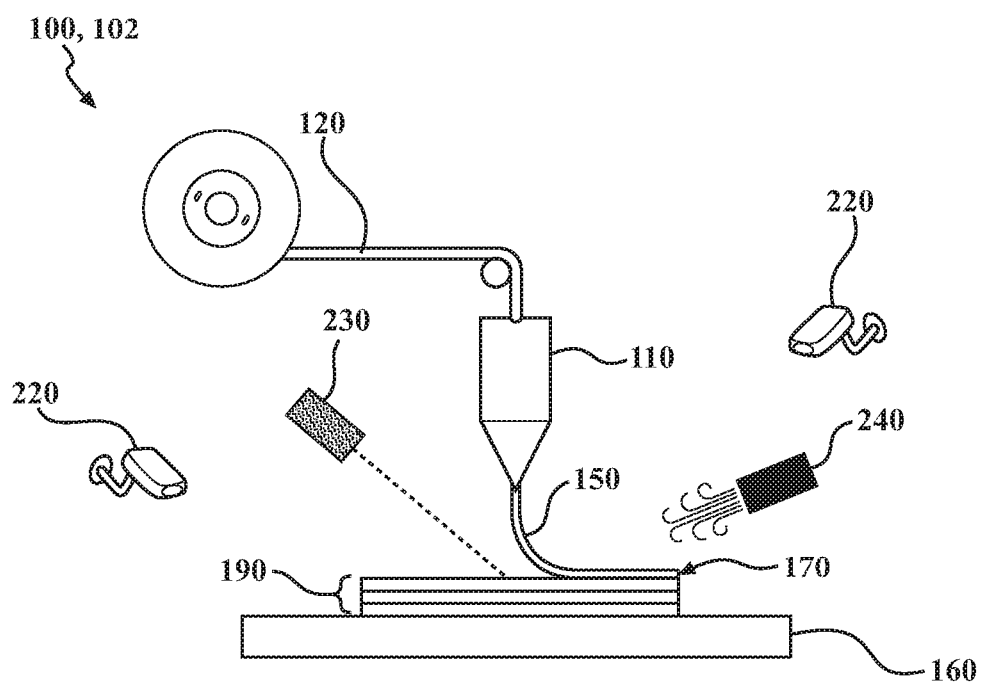
FIG. 1A is a side plan view of a first exemplary molten extrusion fabrication system according to the present disclosure, including a filamentous substrate, an extrusion system, a build object, and a temperature control system.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings include a thermal control system for improving the efficiency of 3D printing devices, including expanding the range of shapes that can be printed and improving the structural integrity of the printed objects. The system monitors temperatures of the object during printing, and lowers the temperature at any given location as needed to increase structural stability, and raises the temperature at any given location as needed to increase material fusion.

The thermal control system of the present teachings includes one or more temperature monitors, configured to measure the temperature of the deposited or during-deposit material during a 3D printing process. The system includes a directed heating element configured to apply heat to a specific location on the build if that location is found to be below a desired temperature. The system includes a directed cooling element configured to remove heat from a specific location on the build if that location is found to be above a desired temperature.

One purpose of the present disclosure is to provide systems and methods to monitor and adjust the temperature of extruded, deposited material in an additive, extrusion-based 3D printing operation. Applicable additive, extrusion-based 3D printing operations can generally include any 3D printer that extrudes and deposits viscous or flowable material in a predetermined pattern with a moving extrusion head to build an object. The extruded and deposited material then solidifies in place at a rate that is at least partly temperature dependent.

Applicable additive, extrusion-based 3D printing operations include two types: high temperature additive, extrusion-based 3D printing operations (referred to alternatively as molten extrusion fabricators); and low temperature additive, extrusion-based 3D printing operations (referred to alternatively as curing extrusion fabricators). Molten extrusion fabricators involve extrusion and deposition of a molten substrate, such as a plastic or metal. Examples of molten extrusion fabricators include fused filament fabrication and fused deposition modeling approaches, or any other systems or methods molten extrusion deposition methods of additive 3D printing. Curing extrusion fabricators involve deposition of a viscous or flowable material that will solidify through a curing process that can be accelerated with an energy input, such as heat or irradiation. Examples of curing extrusion fabricators include 3D printing systems that build objects from substrates such as cement, solutions of monomers that can be polymerized by heat or irradiation, or solutions of linear polymers that can be cross-linked by heat or irradiation.

Figure 1B:
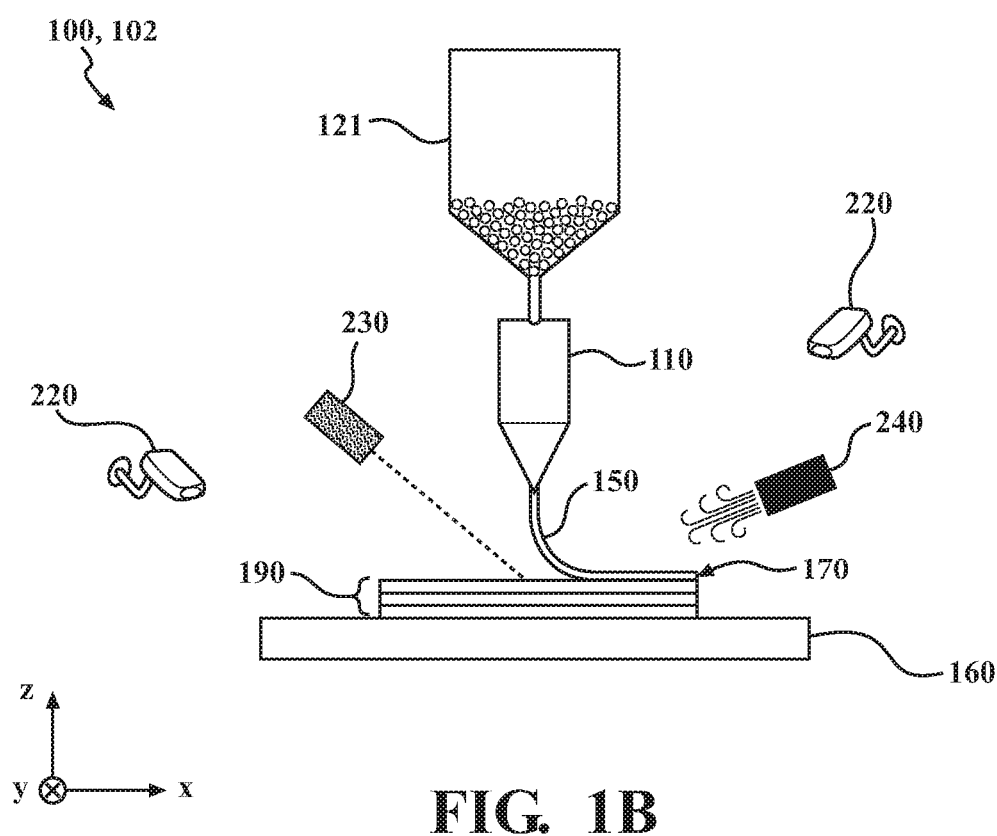
FIG. 1B is a side plan view of a second exemplary molten extrusion fabrication system according to the present disclosure, including a pellet substrate, an extrusion system, a build object, and a temperature control system.
Figure 1C:
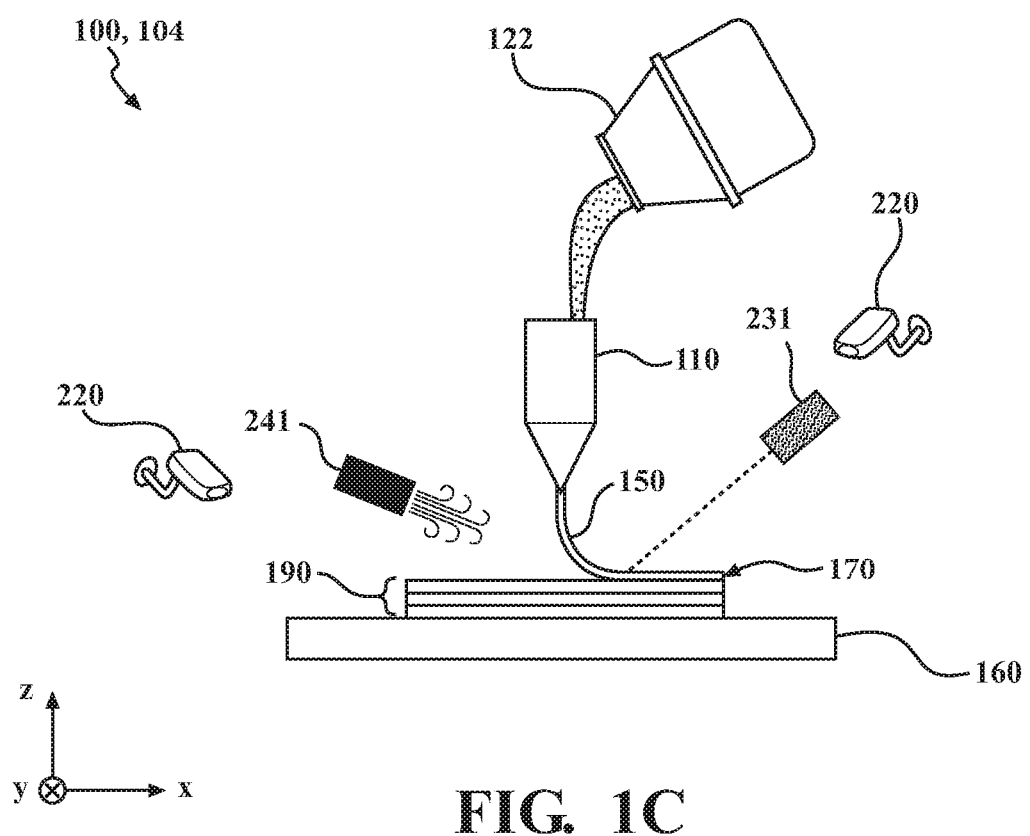
FIG. 1C is a side plan view of an exemplary curing extrusion fabrication system according to the present disclosure, including a cement substrate, an extrusion system, a build object, and a temperature control system.

FIGS. 1A and 1B show an exemplary 3D printing systems 100 of the molten extrusion fabricator 102 type for additively fabricating an object, while FIG. 1C shows an exemplary 3D printing system 100 of the curing extrusion fabricator 104 type. The molten extrusion fabricator 102 type of system 100 of FIG. 1A is a fused filament fabrication system that includes an extrusion head 110, configured to receive a filamentous substrate material 120. Similarly, the molten extrusion fabricator 102 type of system 100 of FIG. 1B is similarly configured, but replaces the filamentous substrate material 120 with a hopper 121 holding pellets of substrate material.

In the systems of FIGS. 1A and 1B, the substrate material 120 can be a thermoplastic resin, a metal, or any other suitable material. In the exemplary views of FIGS. 1A, 1B, and 4, the substrate material (e.g. 120) is fed into the extrusion head 110. The extrusion head 110 can heat the substrate material, converting it to a molten or semi-molten state, and extrudes it as a flowable extrudate 150. The flowable extrudate 150 is initially deposited on a work platform 160, as a road 170. Depending on time and temperature, the road 170 can be, at various portions, solid, molten, or semi-molten.

The extrusion head 110 and the work platform 160 move relative to one another in an x-y plane. As a result, multiple roads (or a single, continuous road) form a layer 180 (FIG. 2), the layer 180 defined by a pattern of roads 170 created by relative movement of the extrusion head 110 and the work platform 160 in the x-y plane. When a layer 180 is completed, the extrusion head 110 and the work platform 160 typically move a distance away from each other in the z-direction and begin a next layer. In the view of FIGS. 1A-1C, three completed layers 190 are shown. In this way, the system 100 additively builds a build object 190 (i.e. the desired object of fabrication), road 170 by road 170, and layer 180 by layer 180.

The curing extrusion fabricator 104 of FIG. 1C includes a 3D printing system using cement as substrate. A cement mixer 122 is thus shown feeding cement to the extrusion head 110. Much of the following discussion of features of the disclosed systems 100 describe the features using a molten extrusion fabricator 102 as an example. It is to be understood that a curing extrusion fabricator 104 can have all of the same features as those described herein for a molten extrusion fabricator 102; it should be noted however that in certain embodiments, the functions of some elements may be reversed, as discussed below.

Figure 2:
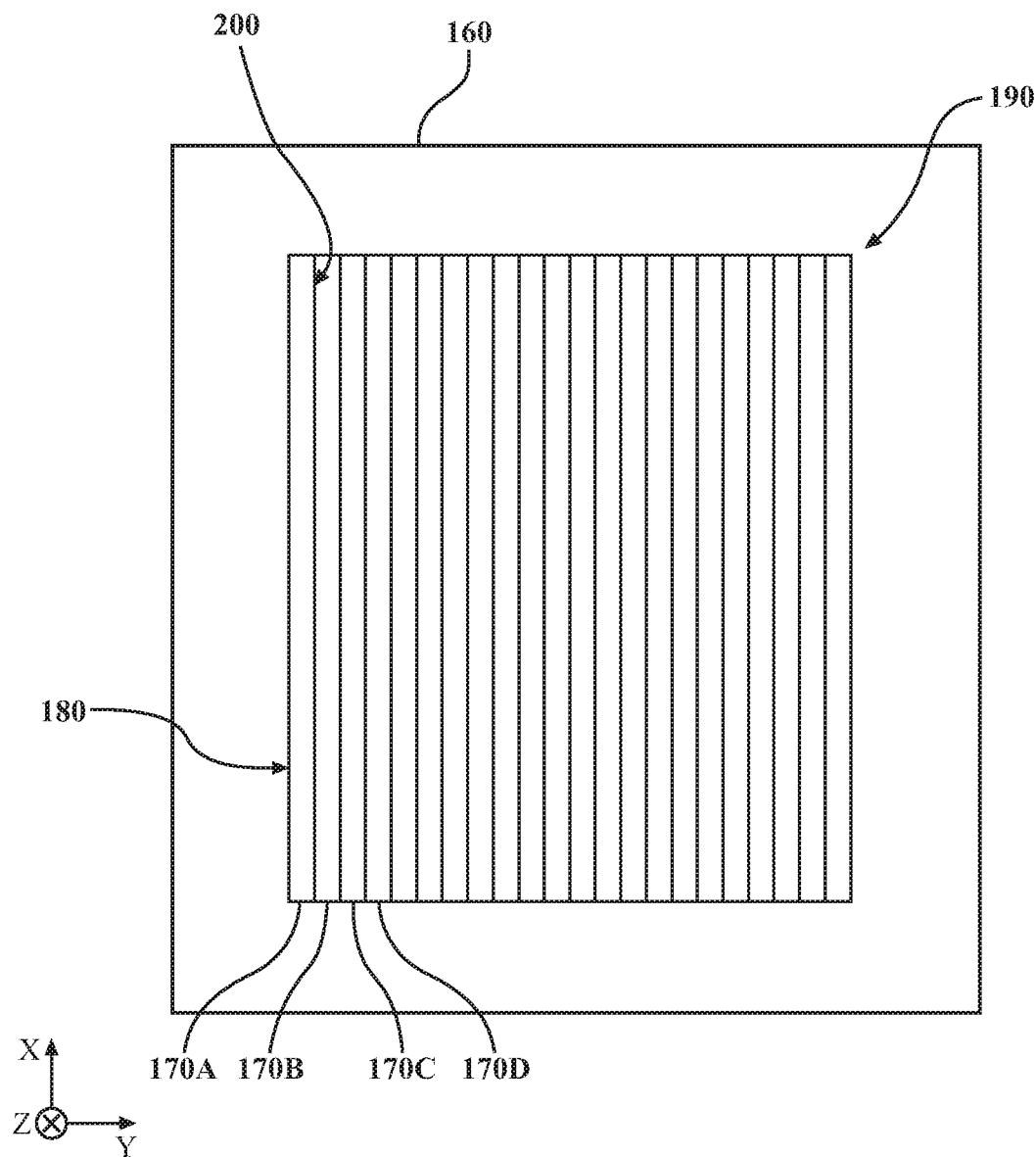
FIG. 2 is an overhead plan view of the build object of FIG. 1.

To form the build object 190 as a continuous, solid structure, rather than a collection of unconnected strands of material, it is necessary to fuse the various roads 170 and layers 180 that constitute the build object 190. Referring particularly to FIG. 2, a newly deposited road (e.g. 170A), will typically initially be molten or otherwise flowable, and thus will tend to fuse with an adjacent, previously deposited road (e.g. 170B) along a contact area 200. In addition, if the adjacent, previously deposited road 170B has solidified due to loss of heat over time, heat transfer from the newly deposited road 170A to the previously deposited road 170B will cause the latter to at least partially melt, improving the effectiveness of fusion. It is to be understood that such a previously deposited adjacent road 170B can be in the same or a different layer 180 as that of the newly deposited road 170A. This fusion process generally requires careful calibration of the temperature of the heating element within the extrusion head 110, as well as control of ambient temperature, such as by inclusion of a heating element within the work platform 160. These factors alone do not always provide adequate fusion, however.

Figure 3:
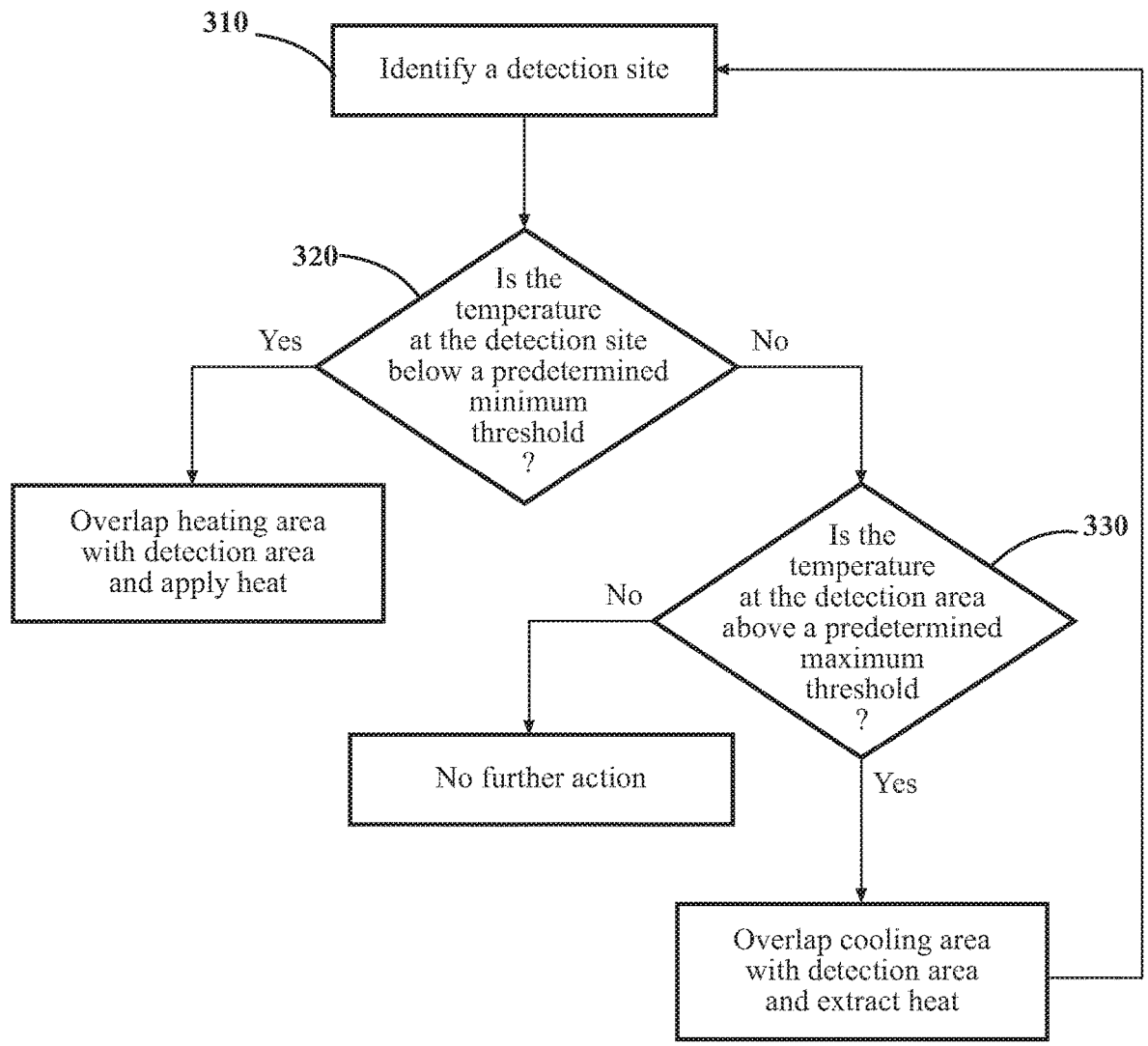
FIG. 3 is a flow diagram of an exemplary algorithm operable by a control element of the system of FIG. 1.

In part to improve the effectiveness of fusion, a system 100 of the present disclosure includes a directed temperature control subsystem. The temperature control subsystem includes a control element. The control element operates an algorithm 300, an example of which is shown in FIG. 3. The control element, operating the algorithm 300, further controls the operation of a directed thermal detector 220, a directed heating element 230, and a directed cooling element 240, as described below. It is to be noted that, in some implementations, the temperature control subsystem can exclude the directed thermal detector 220 and/or the directed heating element 230.

As mentioned, the temperature control subsystem includes at least one directed thermal detector 220, configured detect the temperature of a region of defined area (the detection area) at any location on the build object 190. The thermal detector 220 may, in many implementations, be an infrared temperature detector, but can be any device operable to detect the temperature of a region of defined area on the build object. The thermal detector 220 will generally be capable of translational movement in x, y, and z directions, as well as rotational movement, in order to position the defined area for thermal detection anywhere on the build object as needed, and under the control of the control element 210. It is to be noted that the defined area for thermal detection does not refer to a location, but instead refers to a size of surface area in which thermal detection is performed at any time.

The temperature control subsystem further includes at least one directed heating element 230, configured to heat a region of defined area (the heating area) on the build object 190. The directed heating element 230 can be an infrared laser, or laser of other wavelength, a device configured to direct a stream of heated air or other gas at the build object 190, or any other device operable to heat a region of defined area on the build object 190. Further, the directed heating element 230 is capable of translational motion in the x, y, and z directions, as well as rotational motion. This enables the directed heating element 230, under the control of the control element 210, to relocate the heating area anywhere on the build object, as necessary to improve fusion effectiveness. As above, the heating area refers to the dimension or size of surface area that is heated, rather than to a location.

The temperature control subsystem further includes at least one directed cooling element 240, configured to cool a region of defined area (the cooling area). In some implementations, the directed cooling element 240 can be a device configured to direct a flow of ambient or cooled air or gas at the build object 190. For example, the directed cooling element 240 can be a fan or other air movement device connected to a Peltier thermal transfer element. In some implementations, the directed cooling element 240 can be a device configured to direct an aerosol of volatile liquid at the build object 190, in order to instigate evaporative cooling in the cooling area. It will be appreciated that, in such instances, the volatile liquid will generally be one in which the substrate material 120 has negligible or low solubility. In general, the directed cooling element 240 can be any device operable to cool a region of defined area on the build object 190. In certain embodiments, such cooling can serve the purpose of rapidly converting any flowable portions of the flowable extrudate 150 or roads 170 to a solid. As above, the directed cooling element 240 is capable of translational motion in the x, y, and z directions, as well as rotational motion. This enables the directed cooling element 240, under the control of the control element 210, to relocate the cooling area anywhere on the build object. Also as above, the cooling area refers to the dimension or size of surface area that is cooled, rather than to a location.

It will be understood that a system 100 of the present disclosure generally extrudes and deposits roads 170 having a relatively consistent cross-sectional diameter. While the cross-sectional diameter of a deposited road (hereinafter, "road diameter") can be situationally altered, by changing the design of the extrusion head 110 or, to a lesser extent, by changing the temperature of the extrusion head 110 or composition of the substrate material 120, the road diameter may be fairly consistent for a given system 100 design. In various implementations, any or all of the detection area, heating area, and cooling area can be defined as multiples or fractions of the road diameter. For example, in some implementations, any or all of the detection area, heating area, and cooling area can be less than ten times the average road diameter. In some implementations, any or all of the detection area, heating area, and cooling area can be less than the average road diameter. In some implementations, any or all of the detection area, heating area, and cooling area can be less than one-tenth the average road diameter.

In some implementations, it will be desirable for the diameter of the detection area and/or the heating area to be equal to or smaller than the road diameter. For example, in some implementations it will be desirable for the directed thermal detector 220 to measure the temperature of an individual road 170, such as a freshly deposited road 170A or an adjacent contacting road 170B. Similarly, in some instances, it will be desirable for the directed heating element 230 to selectively heat a portion of an individual road 170, such as a freshly deposited road 170A or a previously deposited adjacent road 170B. In some instances, it will be desirable for the directed heating element 230 to selectively heat a contact area 200.

Referring again to FIGS. 1A-1C, it will be noted that the positions of the directed heating element 230 and the directed cooling element 240 are substantially reversed in FIG. 1C relative to their positions in FIGS. 1A and 1B. This illustrates that, in some implementations, the directed cooling element 240 may perform the function for a curing extrusion fabricator 104 that the directed heating element 230 performs for a molten extrusion fabricator 102. Similarly, the directed heating element 230 may perform the function for a curing extrusion fabricator 104 that the directed cooling element 240 performs for a molten extrusion fabricator 102. For example, in the case of a 3D printer using cement substrate, the directed cooling element 240 can be employed to maintain the flowable extrudate 150 and/or roads 170 in a flowable state, by decreasing the curing rate of the substrate, e.g. cement. Similarly, the directed heating element 230 can be employed to rapidly convert flowable portions of the flowable extrudate 150 and/or roads 170 to a solid, by increasing the curing rate of the substrate, e.g. cement. In other respects, the operation of the system 100 is the same.

Thus, the exemplary algorithm of FIG. 3 operated by the control element 210 includes a first step 310 of identifying a detection site. A detection site is any point on the build object 190 toward which the directed thermal detector 220 can be focused. The detection site can be on a freshly laid road 170A, on an adjacent contacting road 170B, on a contact area 200, or anywhere else on the build object 190. In some implementations, the detection site can be defined as a site where additional roads 170 are to be deposited. In a second step 320, the control element 210 determines, based on data obtained from the directed thermal detector 220, whether the temperature at the detection site is below a predetermined minimum temperature threshold. The predetermined minimum temperature threshold can be set for the entire build object or can be set differently depending on the location of the detection site. For example, the minimum temperature threshold at a freshly laid road 170A could be set at the melting temperature of the substrate material 120, whereas the minimum temperature threshold at a different location could be lower. In some embodiments, the predetermined minimum temperature threshold can be 5-10% lower than the temperature at which the substrate material 120 is extruded from the extrusion head 110.

If the temperature at the detection site is determined to be below the predetermined minimum temperature threshold, then the control element 210 will move the directed heating element so that the heating area overlaps the detection area and heat is applied to the detection area. The application of heat can be performed for a calculated amount of time, or can be performed until the temperature of the detection site reaches a desired temperature, as determined by periodic measurements by the directed thermal detector 220.

If the temperature at the detection site is determined not to be below the predetermined minimum threshold temperature, then the control element 210 determines whether the temperature of the detection area is above a pre-determined maximum temperature threshold 330. The predetermined maximum temperature threshold can be set for the entire build object or can be set differently depending on the location of the detection site. For example, the maximum temperature threshold at a previously laid road 170B could be set at the melting temperature of the substrate material 120, whereas the maximum temperature threshold at a freshly laid road could be higher.

If the temperature at the detection site is determined to be above the predetermined maximum temperature threshold, then the control element 210 will move the directed cooling element so that the cooling area overlaps the detection area and heat is removed from the detection area. The removal of heat can be performed for a calculated amount of time, or can be performed until the temperature of the detection site reaches a desired temperature, as determined by periodic measurements by the directed thermal detector 220. It is to be appreciated that steps 320 and 330 are not required to be in a particular order. In some implementations, such as a curing extrusion fabricator 104 that employs a directed cooling element 240 to slow curing and a directed heating element 230 to speed curing, it may be desirable for step 330 to precede step 320. Steps 320 and 330 can also be performed simultaneously.

Figure 4:
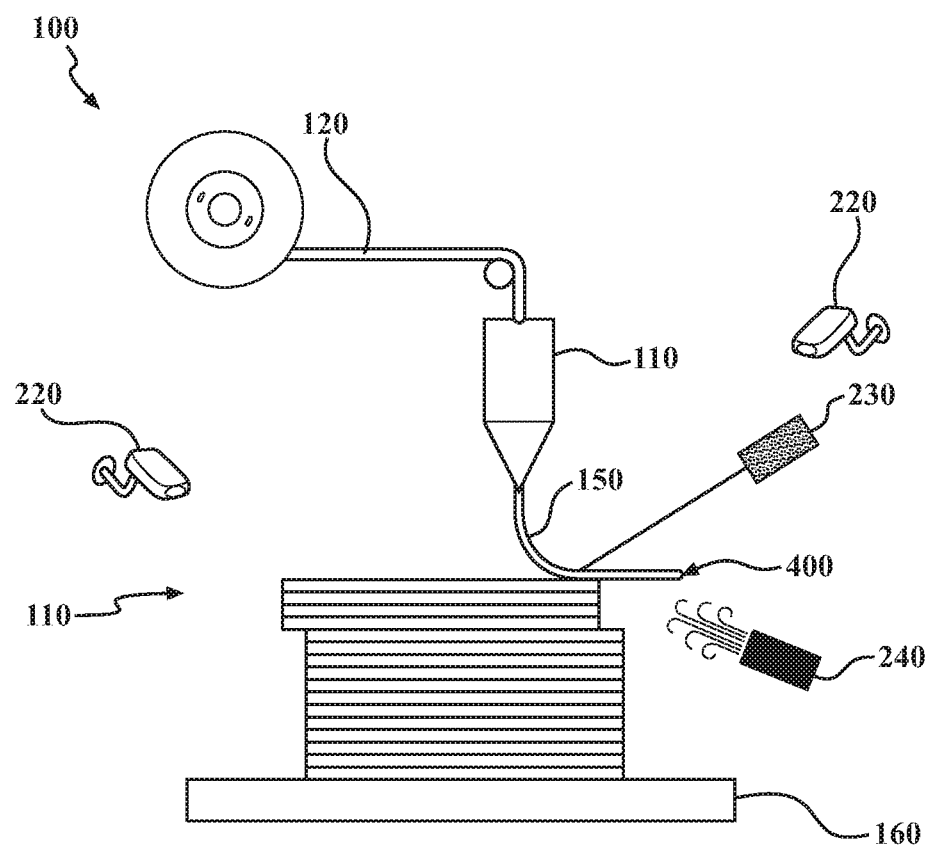
FIG. 4 is a side plan view of the additive fabrication system of FIG. 1, shown at a later stage of fabrication and having an unsupported overhang.

With reference to FIG. 4, the system 100 of the present disclosure, and in particular the temperature control subsystem, will in many instances be useful for facilitating additive fabrication of an unsupported overhang 400. As shown in FIG. 4, an unsupported overhang 400 is a portion of a road 170 and/or layer 180 that protrudes horizontally and is vertically unsupported by previously deposited layers. In different implementations, an unsupported overhang 400 can also be angled or curved, rather than entirely horizontal. In conventional additive fabrication systems such as a fused filament fabrication system, an unsupported overhang 400 must be avoided because it would collapse due to the molten or semi-molten character of a freshly laid road 170A. This limits the range of shapes that can be fabricated using a conventional approach.

The system 100 of the present disclosure, having a temperature control subsystem, enables fabrication of a build object 190 having an unsupported overhang 400. The directed cooling element 240 can be controlled to cool the underside 405 of an unsupported overhang 400, solidifying the underside 405 and thus structurally stabilizing the unsupported overhang 400. A method for stabilizing an unsupported overhang 400 includes a step of identifying an unsupported overhang 400. It will be understood that such identification can be performed automatically from build dimensions. For example, build instructions will typically be based on a CAD design, or other design showing physical dimensions of the build object. It would be possible to determine from such dimensions when a freshly laid road 170A will extend horizontally beyond a directly supporting layer 180 by any given distance. Thus, an unsupported overhang 400 could be identified as a freshly laid road 170 that will extend beyond a directly supporting layer 180 by a threshold distance. Such a threshold distance could be based on the radius of the road 170, the composition of the substrate material 120, the temperature of the extrusion head 110, or other factors.

In a second step, a directed cooling element 240 is controlled to remove heat from a road 170 that constitutes a portion of the overhang 400, while the road is being deposited. Typically, the directed cooling element 240 will be directed to remove heat from the underside 405 of the road 170, and may simultaneously remove heat from multiple adjacent roads 170 that constitute a portion of the overhang 400.

The method can optionally include a step of simultaneously heating a portion of the overhang 400. For example, a directed heating element 230 can be directed to heat the top side 410 of a freshly laid road 170A, an adjacent road 170B, a contact area 200, or any other top side 410 portion of the identified overhang 400. This can be done while the directed cooling element 240 simultaneously cools the underside 405 of the overhang. The simultaneous underside 405 cooling and top side 410 heating can have the combined result of providing structural stability to the overhand while enabling individual roads 170 to fuse with one another.

The following description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A system for reinforcing portions of a build object formed by an additive, extrusion-based 3D printing operation, the system comprising:
    an extrusion head configured to receive a substrate material and to selectively deposit the substrate material as a continuous road or as a multiplicity of roads to create a build object;
    at least one directed cooling element comprising a device for directing an aerosol of a volatile liquid and configured to cool a region of defined area anywhere on the build object; and
    a control element configured to direct the at least one directed cooling element to remove heat from the road while the road is deposited, and further configured to identify an upcoming extrusion of an unsupported overhang portion, and to direct the at least one directed cooling element to solidify the unsupported overhang portion simultaneous with extrusion of the unsupported overhang portion.

2. The system as recited in claim 1, wherein the region is equal to or smaller than a cross-sectional diameter of the road.

3. The system as recited in claim 1, further comprising a directed thermal detector, wherein the directed thermal detector comprises an infrared sensor.

4. The system as recited in claim 3, further comprising a directed heating element, wherein the directed heating element comprises an infrared laser or a device for directing a stream of heated gas.

5. The system as recited in claim 4, wherein the control element is configured to simultaneously heat and cool different regions.

6. The system as recited in claim 4, wherein each of the directed thermal detector, the directed heating element, and the at least one directed cooling element is movable with respect to the build object along x, y, and z axes.

7. The system as recited in claim 1, wherein the at least one directed cooling element is configured to solidify an underside of the unsupported overhang portion.

8. The system as recited in claim 1, further comprising at least one directed heating element, wherein the directed heating element comprises an infrared laser or a device for directing a stream of heated gas.

* * * * *